United States Patent
Linke

(10) Patent No.: US 7,292,445 B2
(45) Date of Patent: Nov. 6, 2007

(54) ACTIVE INTEGRATED RECTIFIER REGULATOR

(75) Inventor: Mario Linke, Kempen (DE)

(73) Assignee: Siliconix Technology C.V.-IR, Singapore (SG)

( * ) Notice: Subject to any disclaimer, the term of this patent is extended or adjusted under 35 U.S.C. 154(b) by 288 days.

(21) Appl. No.: 10/787,492

(22) Filed: Feb. 25, 2004

(65) Prior Publication Data

US 2004/0232538 A1    Nov. 25, 2004

Related U.S. Application Data

(60) Provisional application No. 60/449,777, filed on Feb. 25, 2003.

(51) Int. Cl.
*H05K 7/20*    (2006.01)

(52) U.S. Cl. .................. 361/715; 361/709; 361/702; 361/704

(58) Field of Classification Search ............. 361/715, 361/704, 709, 702
See application file for complete search history.

(56) References Cited

U.S. PATENT DOCUMENTS

| | | | | |
|---|---|---|---|---|
| 3,812,390 A | * | 5/1974 | Richards | 310/68 D |
| 3,959,676 A | * | 5/1976 | Striker | 310/68 D |
| 4,065,686 A | * | 12/1977 | Moore | 310/68 D |
| 4,169,282 A | * | 9/1979 | Allport et al. | 363/145 |
| 4,284,915 A | * | 8/1981 | Hagenlocher et al. | 310/68 D |
| 4,395,673 A | * | 7/1983 | Kurz | 322/28 |
| 4,449,089 A | * | 5/1984 | Winkler | 320/104 |
| 4,489,374 A | * | 12/1984 | Yoshida | 363/145 |
| 4,606,000 A | * | 8/1986 | Steele et al. | 363/145 |
| 4,799,309 A | * | 1/1989 | Cinzori et al. | 29/596 |
| 4,952,829 A | * | 8/1990 | Armbruster et al. | 310/68 D |
| 5,043,614 A | * | 8/1991 | Yockey | 310/68 D |
| 5,659,212 A | * | 8/1997 | DePetris | 310/68 D |
| 6,327,128 B1 | * | 12/2001 | De Petris | 361/103 |
| 6,528,911 B1 | * | 3/2003 | De Petris | 310/64 |
| 6,621,703 B2 | * | 9/2003 | De Petris | 361/704 |
| 7,109,687 B2 | * | 9/2006 | Kashihara | 322/24 |
| 2003/0133267 A1 | * | 7/2003 | Beihoff et al. | 361/704 |

* cited by examiner

*Primary Examiner*—Anatoly Vortman

(57) ABSTRACT

An active integrated rectifier and regulator module for providing charging current to a battery of an automobile including a stacked structure comprising two lead frames disposed above on another, the module including a voltage regulator and elements for active rectification of alternating current from a stator.

6 Claims, 15 Drawing Sheets

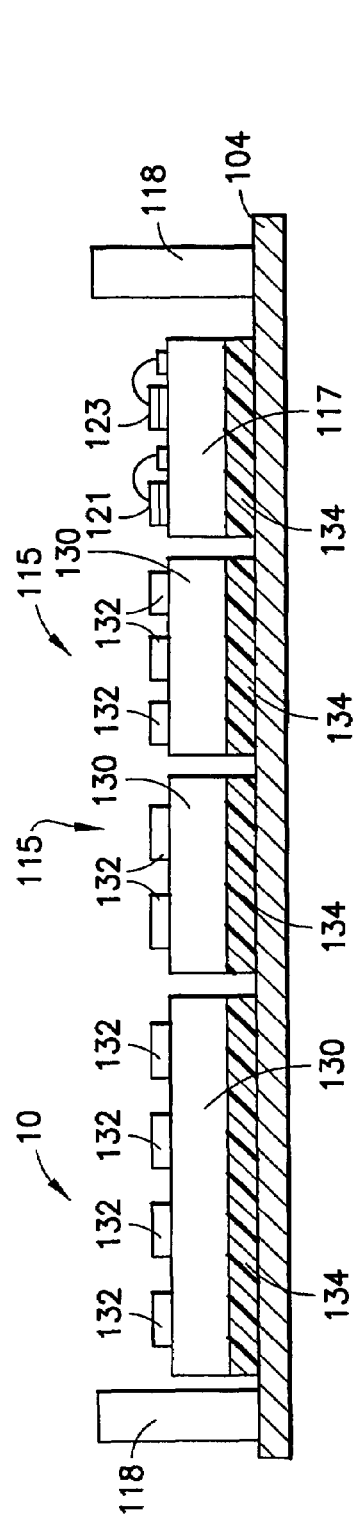
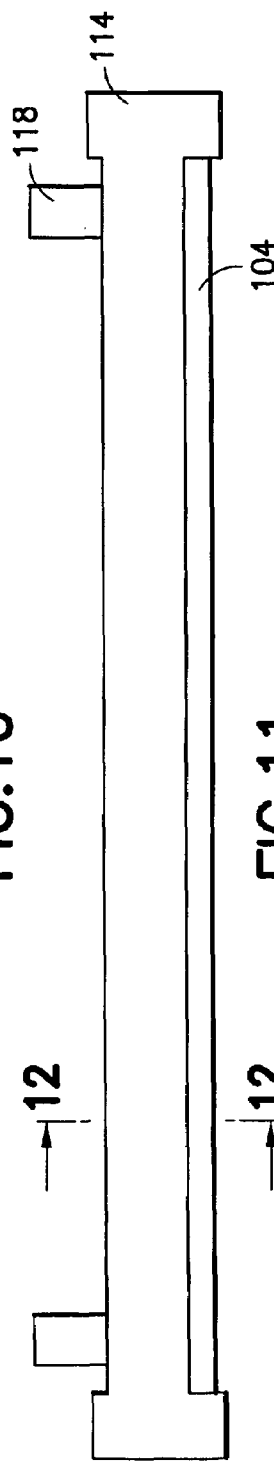
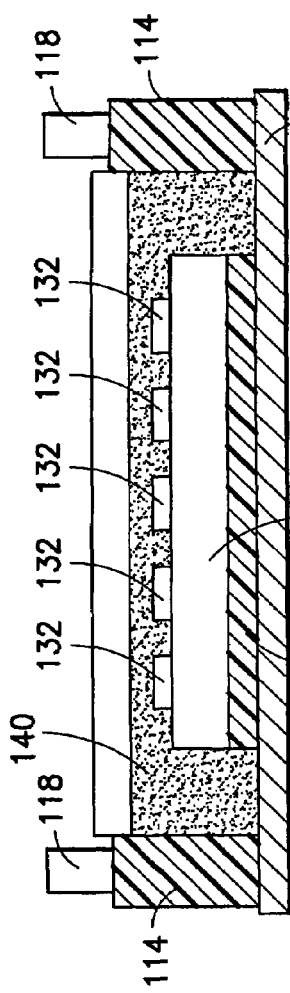
FIG.10
FIG.11
FIG.12

ACTIVE INTEGRATED RECTIFIER REGULATOR

RELATED APPLICATION

The application is based on and claims benefit of U.S. Provisional Application No. 60/449,777, filed Feb. 25, 2003, entitled Active Integrated Rectifier Regulator, to which a claim of priority is hereby made.

BACKGROUND OF THE INVENTION

In the last decade, the automotive industry has seen a rise in demand for electrical energy especially for light vehicles. This trend is the result of an increase in the amount of electrical comfort and safety features in modem vehicles. Another contributing factor is the increasing electrification of formerly purely mechanical functions as can be seen by all the upcoming x-by-wire systems.

The development in electrical power generation has been struggling to keep up with this demand. However, the entrance barriers associated with new concepts for power generation systems have so far been too high to allow a quick proliferation. Nevertheless, there have been many developments in many research labs of the automotive industry directed to alternative generation systems that provide sufficient power to feed most of the additional functions. These systems include dual output alternators, switch-mode rectification, starter-generators, and active rectifiers.

Of these systems the starter-generator has received the highest publicity. The starter-generator system, however, has the highest development cost, tooling cost and implementation cost (in terms of re-packaging the engine compartment). Also, dual output alternators and switch-mode rectification both have technical disadvantages.

Active rectification has been discussed for a long time, but only recently has the development in high end FETs made the concept feasible.

Active rectification is simply the replacement of passive diodes with active FETs. These FETs are switched ON/OFF to perform the rectification function similar to the "automatic" switching initiated by the forward voltage drop of a diode. For example, in active synchronous rectification the FETs are turned ON/OFF according to the frequency of the stator phases.

For active rectification detection driver circuits are required to generate the gate voltage (derived from the stator phase voltages) necessary for switching a FET ON/OFF, thereby rectifying the current like a diode. Active rectification, however, results in much lower losses since the voltage drop across a FET is only a fraction of the forward voltage drop of a diode. As a result, less energy is wasted, which allows for higher output.

Typically, active rectification is more difficult at high rpm due to timing issues. However, at low rpm rectification is more effective.

SUMMARY OF THE INVENTION

In the automotive art, most generation systems are underpowered at idle speed, which results in the negative charging of the battery. According to the present invention active rectification is employed to improve power generation, which at idle speed (low rpm) brings the charging balance back into the positive region.

According to the present invention an active integrated rectifier regulator (AIRR) is employed to improve the efficiency of the electrical system of an automobile. An AIRR according to the present invention includes a regulator, which is used for keeping the output voltage of the alternator constant, with an active rectifier in one module. This module is attached to the outside of the alternator and is preferably cooled by the water from the vehicle cooling system.

An AIRR according to the preferred embodiment of the present invention regulates and rectifies a very large alternator having 525 A maximum output and above 200 A output at idle rpm. The alternator in the preferred embodiment has a double stator winding with two output terminals. Such an alternator basically consists of two alternators combined into one and is usually used to power the electrical system of a luxury vehicle, which spends more than the fleet average time in or near idle rpm.

A conventional passive diode rectifier according to prior art is capable of achieving only 160 A output at idle speed, which is not sufficient to keep the charging balance of the vehicle's electrical system positive. Through the implementation of an AIRR according to the present invention the output at idle can be well within the positive charging balance region.

In addition an AIRR according to the present invention can include additional features, such as, active load dump control, output difference monitoring, fault indication and fail-safe strategies.

The voltage regulator in an AIRR according to the present invention monitors the voltage of an output terminal at an alternator and regulates the field excitation current to its rotor to keep the output voltage stable. The regulator may be conventional with internal temperature compensation, load response control regulation, or intelligent regulation with bi-directional communication to the ECU.

A standard regulator operates in a proportional control loop. The voltage set-point follows a temperature dependent "Z" curve, to allow for optimal battery charging at all temperatures for maximum battery life.

With load response control regulation, the output response of the regulator is adjusted when large changes in the load status of the vehicle electrical system occur. The regulator then moves to the desired set-point voltage linearly. This strategy is executed within a defined time interval ramp of typically a few seconds and prevents large voltage spikes from occurring.

Intelligent regulation allows for bidirectional communication between the regulator and the vehicle's ECU. The set-point can be adjusted to allow for a specific driving situation, taking into account the sensory information that is available from the ECU. Intelligent regulation allows for better idle stability, improved battery life, idle-up functionality for additional electrical power at low rpm, and wide-open-throttle operation, where the mechanical load of the alternator on the engine is drastically reduced in case of kick-down acceleration of the vehicle.

In an AIRR according to the present invention, the output from each phase of the alternator is rectified by a respective active bridge, which is comprised of a high side power FET and a low side power FET.

In the preferred embodiment, because of the double stator arrangement of the alternator, an AIRR according to the preferred embodiment of the present invention includes six bridges each associated with a phase, and is adapted to feed its outputs into two B+ terminals.

In an alternative embodiment, each power FET is replaced with two parallel-connected power FETs for better current handling. Thus, for an AIRR that is equipped with six bridges (to rectify current from a double stator arrangement) a total of twenty-four FETs are used.

Advantageously, in an AIRR according to the present invention, the positive temperature coefficient of the on resistance of the FETs stabilizes the parallel-connected devices. In addition, inclusion of appropriate resistances in the gate drive paths prevents high frequency oscillations.

In rectifiers using diodes, the inevitable diode voltage drop of about 1 Volt leads to effective resistances of tens of milliOhms. The on-state resistance of the FETs is only a couple of milliOhms and therefore over one order of magnitude better than the diodes. Thus, the on-state resistance of an AIRR according to the present invention is much lower than the prior art.

In an AIRR according to the present invention, the FET components are integrated into a module as bare die, thereby eliminating most of the additional resistance which stems from the conventional packaging of housed components. Also, lead lengths can be kept much shorter than the lead lengths of conventional housed components, greatly improving the high frequency behavior of the module.

In order to drive each active rectifier bridge in an AIRR according to the present invention, a detection circuit for active phase voltage sensing is provided to sense the zero crossing of the stator phase voltage. The zero crossing generates a signal which is then amplified in a driver circuit and fed to the gate of an appropriate FET. The signal is conditioned to cause soft switching, so as not to generate transients. It is also sufficiently fast in order to keep switching losses negligible.

Preferably, the detection circuit has a safety threshold to prevent a "shoot-through" which occurs when both high-side and low-side switches are conducting at the same time. In an AIRR according to the present invention, each switch has its own driver and detection circuit.

An AIRR according to the present invention may also include a feature for protection against load dump. Load dump is a reference to large changes in the load status which cause large voltage spikes due to inductive effects. A load dump may cause a short inductive "voltage-kick" in which the energy of the stator coils is released. Although the voltage spike is quite high, the duration of this kick is quite short. An AIRR according to the present invention protects against this voltage spike with a suppressor diode.

A load dump can also cause the excitation field coil (rotor coil) to remain energized. As a result, the excitation field coil will need much longer to adjust and can keep the output current high for several hundred milliseconds, which causes a voltage rise that is lower than the spike described above, but longer lived.

An AIRR according to the present invention can protect the electrical system against the latter voltage rise by actively sensing the system voltage level and actively discharging the field excitation coil once the system voltage exceeds 30 Volts thereby reducing the natural decay time of the field coil.

In the preferred embodiment of the present invention, because of the double stator configuration of the alternator and the resulting double output of an AIRR according to the present invention, the output voltage of the two terminals can be greatly different due to failure. This situation is not desirable and can negatively affect the charging balance and the electrical system. An AIRR according to the present invention may include a feature that monitors the voltage difference of the two B+ output terminals. If a certain threshold is exceeded, the warning lamp is activated and the regulator decreases the output of the machine.

In an AIRR according to the present invention several fault indications and fail-safe strategies can be implemented depending on the application requirements. Some typical fault indicators and fail-safe features are:

over-/under-voltage protection;
loss of communication protection;
default regulation protection;
emergency operation protection; and
over-temperature protection.

According to the present invention, all features relating to active regulation and rectification are included in a single AIRR module.

According to an aspect of the present invention, functional features such as rectification and voltage regulation are provided on a single base plate, and interconnected to external elements through a novel stacked lead frame arrangement.

BRIEF DESCRIPTION OF THE DRAWINGS

FIG. 10 schematically shows a cross-sectional view of the base plate shown in FIG. 9 along line 10-10 viewed in the direction of the arrows.

FIG. 11 schematically shows a plan side view of a partially assembled module according to the present invention.

FIG. 12 shows a cross-sectional view of the partially assembled module as shown in FIG. 11 along line 12-12 viewed in the direction of the arrows.

DETAILED DESCRIPTION OF EMBODIMENTS OF THE INVENTION

Figure 1:
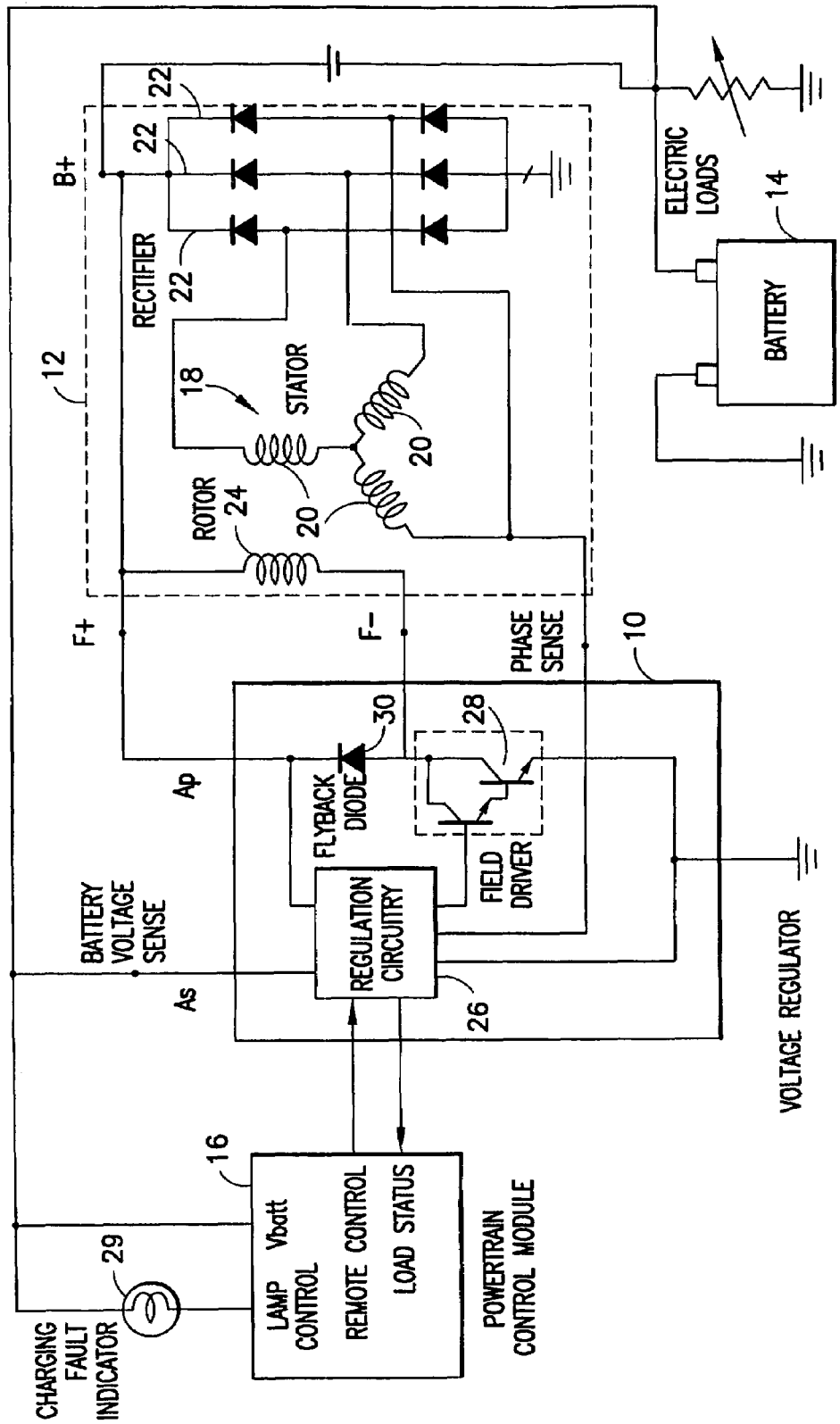
FIG. 1 schematically shows a power supply scheme for supplying charging power to the battery of an automobile according to prior art.

Referring to FIG. 1, a conventional automotive electrical system includes voltage regulator 10, alternator 12, battery 14, and power train control module (PCM) 16. As is well known, alternator 12 is operatively coupled to the engine to produce an electrical output.

A conventional alternator 12 includes a three phase stator 18. Stator 18 includes three phases 20. The output from each phase 20 is connected to a respective half wave diode rectifier 22 for rectification. As a result, the alternating current produced by stator 18 is transformed into a DC current. The DC current obtained is then used to, among other functions, charge battery 14.

Alternator 12 further includes field coil 24. Voltage regulator 10 regulates the current supplied to field coil 24 in order to control the output of stator 18, and, consequently, the output of alternator 12.

Voltage regulator 10 includes regulation circuit 26, and field driver switch 28. In one known design, regulation circuit 26 senses the voltage from battery 14, and after comparing the same to a threshold voltage level operates field driver switch 28 to provide current to the field coil 24 in order to lower or raise output from alternator 12. Voltage regulator 10 includes fly back diode 30 to block power spikes that may damage field driver switch 28.

In a conventional system such as the one shown by FIG. 1, PCM 16 controls many functions related to engine control. PCM 16 may be, for example, adapted to receive load status from voltage regulator 10. The load status may be an indication of the output of alternator 12. In response to the load status, PCM 16 may provide a signal to voltage regulator 10 in order to adjust the current that is supplied to field coil 24.

A conventional system also includes fault indicator 29 connected to PCM 16 in order to provide a signal when charging fault is detected.

Figure 2:
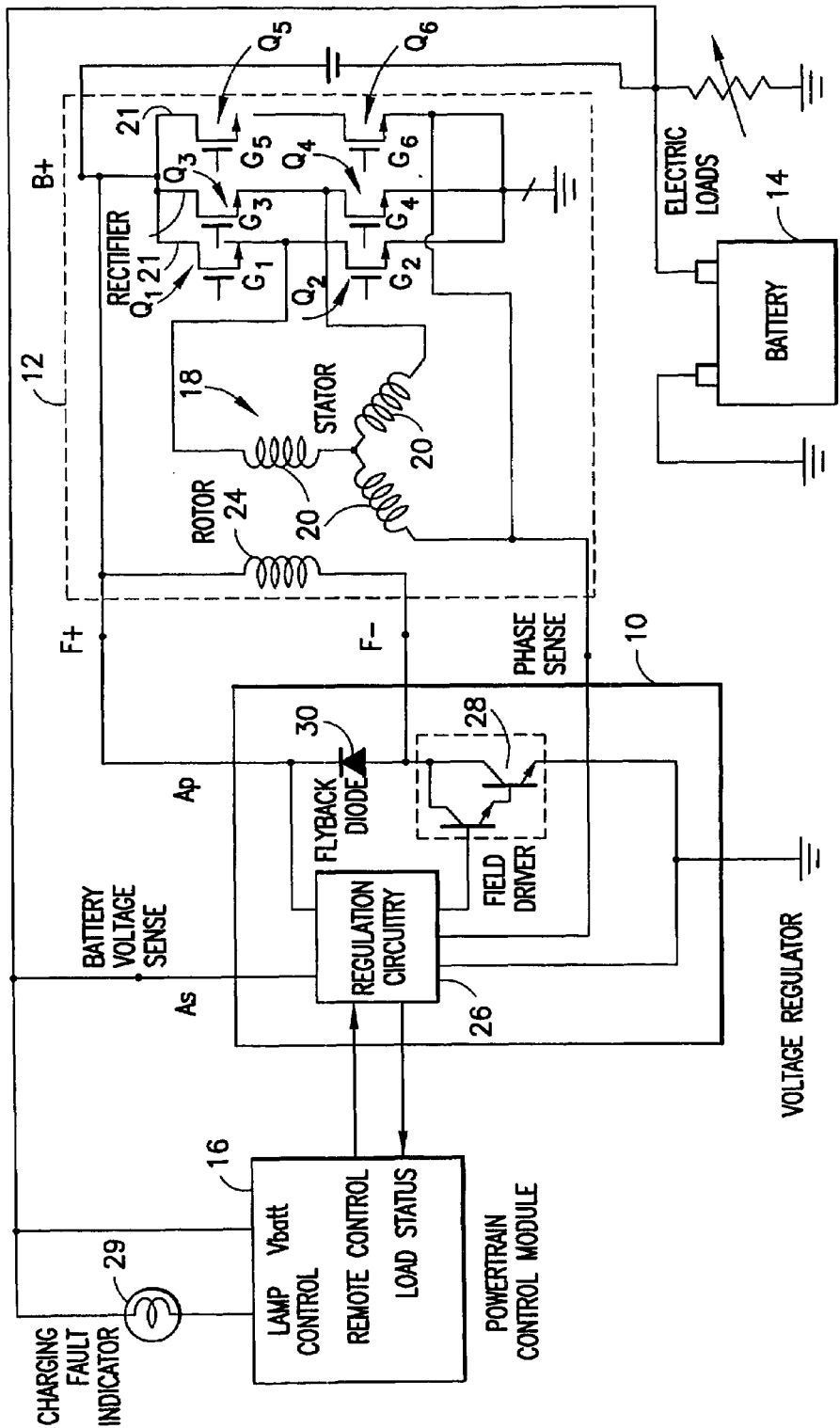
FIG. 2 schematically shows a power supply scheme for supplying charging power to the battery of an automobile using active rectification.

Referring to FIG. 2, an AIRR according to the present invention implements active rectification by replacing each half wave diode rectifier 22 in the prior art rectification scheme by an active rectifier using active elements such as power MOSFETs Q1, Q2, Q3, Q4, Q5, Q6. According to the present invention power MOSFETs Q1, Q2, Q3, Q4, Q5, Q6 are arranged to constitute three half bridge rectifier circuits 21, each half bridge being used to rectify the current from a respective phase 20 of stator 18.

Figure 3:
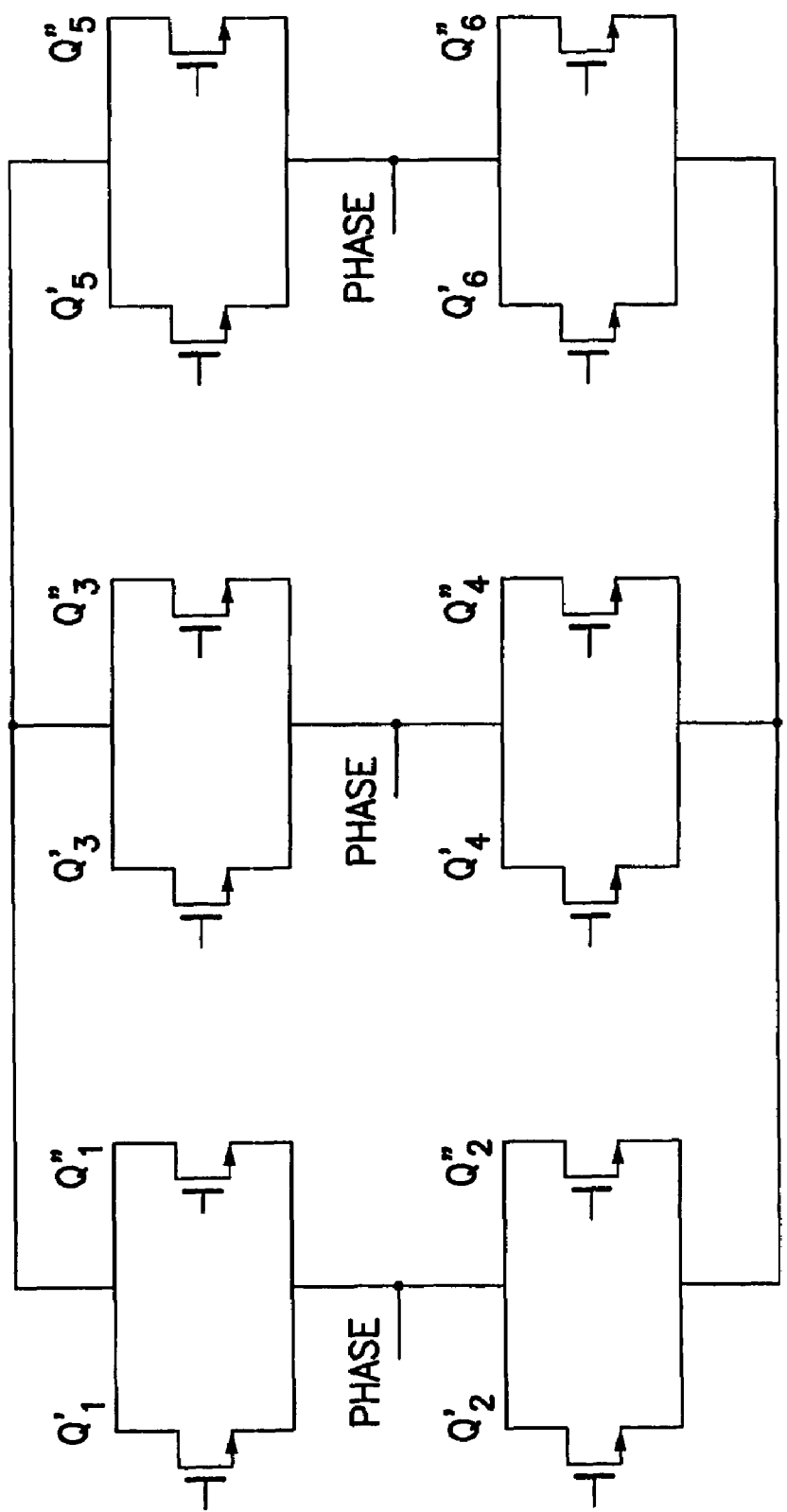
FIG. 3 illustrates an alternative arrangement of power elements usable in an active rectification scheme.

In one embodiment, each power MOSFET Q1, Q2, Q3, Q4, Q5, Q6 shown in FIG. 2 may be replaced with two parallel connected power MOSFETs Q1', Q1", Q2', Q2", Q3', Q3", Q4', Q4", Q5', Q5", Q6', Q6" as shown in FIG. 3 in order to improve current handling.

In another embodiment of the present invention, six half bridge circuits are provided to rectify the current supplied from a double stator arrangement. Such an embodiment may be implemented using two parallel-connected power MOSFETs instead of one power MOSFET. As a result, twenty four power MOSFETs may be required for implementing an AIRR according to this alternative embodiment.

Figure 4:
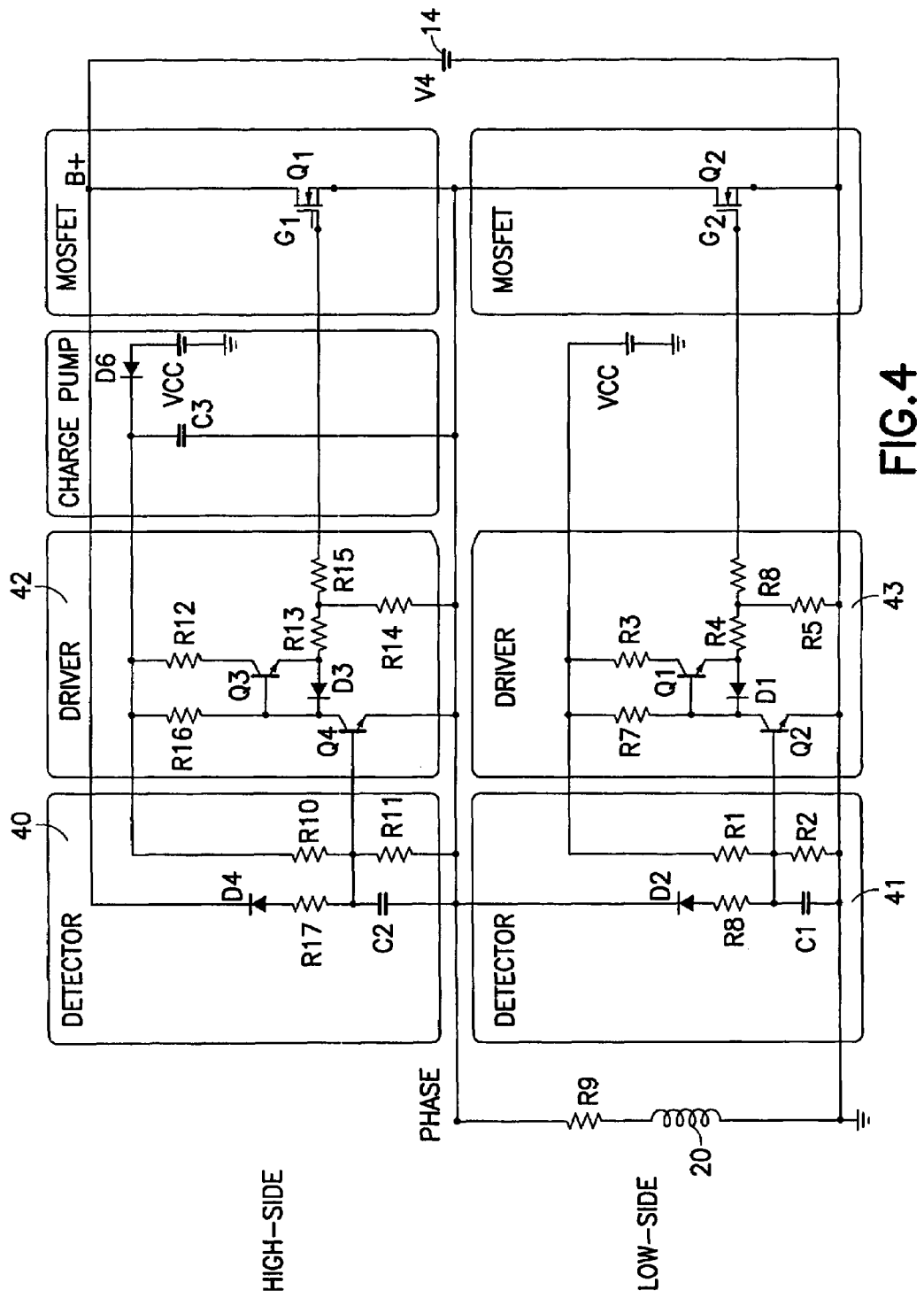
FIG. 4 illustrates an active rectification scheme for rectifying current from one phase of a stator.

FIG. 4 shows schematically an example of an active rectification scheme which may be used in an AIRR according to the present invention. For the sake of convenience FIG. 4 illustrates the active rectification scheme applied to one phase 20 of stator 18. One skilled in the art would recognize that each phase 20 could similarly be rectified in order to provide DC current to battery 14 of an automobile.

Referring to FIG. 4, the basic rectification scheme used for each phase 20 of stator 18 includes first power MOSFET Q1 (high side) and a second power MOSFET Q2 (low side) connected in a half-bridge configuration, a detection circuit 40 (high side), 41 (low side) associated with a respective power MOSFET Q1, Q2, and a driver circuit 42 (high side), 43 (low side) operatively connected to the gate electrode, $G_1$, $G_2$, of a respective power MOSFET, e.g. Q1, Q2.

In the alternative embodiment of the present invention, two parallel-connected power MOSFETs can be used instead of one power MOSFET for each one of high side MOSFET Q1 and low side MOSFET Q2 in order to improve current handling. Furthermore, in an active rectification circuit according to another preferred embodiment of the present invention, six half-bridge circuits can be provided to rectify the current from two-three phase stators (double stator arrangement) contained within a double output alternator.

Figure 5A:
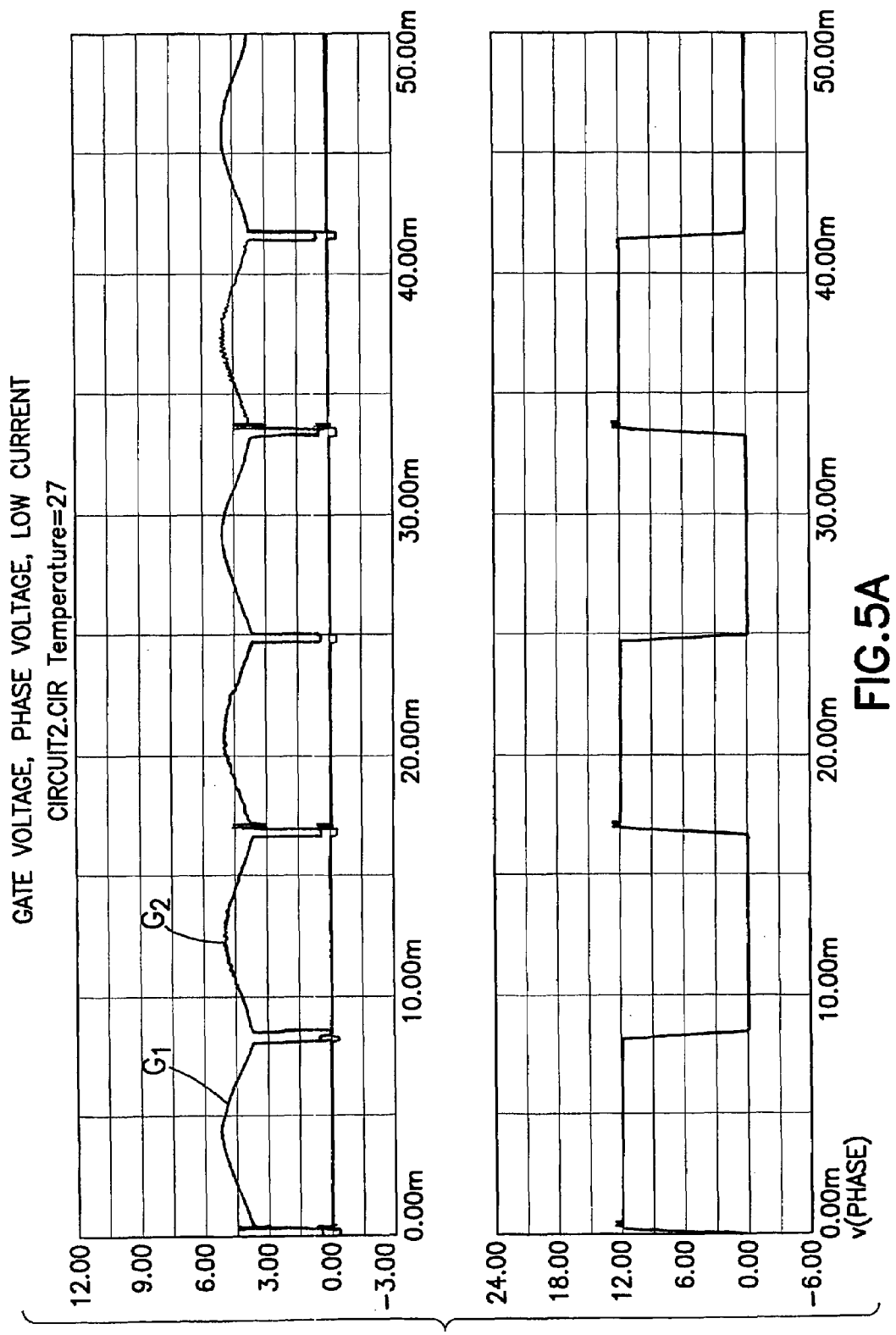
FIGS. 5A-5C illustrate the changes in the gate voltage applied to respective gates of the power elements in the active rectifier circuits in response to the changes in the phase voltage for low, medium, and high current conditions respectively.

FIG. 5A graphically shows the gate signals supplied to G1 and G2 in response to the current received from a phase 20 of stator 18. Specifically, FIG. 5A shows that once detector 40 detects an upwardly moving voltage on its phase 20 it provides a signal to its associated driver 42. In response to the signal received from detector 40, driver 42 begins to apply voltage to G1 of power MOSFET Q1. Once maximum voltage (in the example shown maximum voltage is 12V) is reached, the gate voltage is continued until detector 40 detects a downwardly moving voltage on its phase 20. In response to the downwardly moving voltage, gate signal to G1 is shut off by driver 42 until the lowest voltage is reached (in the example shown lowest voltage is zero). Thereafter, deadtime is provided to prevent a shoot through condition. After the passage of the deadtime, detector 41 provides a signal to driver 43 so that gate voltage may be applied to G2 of Q2.

Figure 5B:
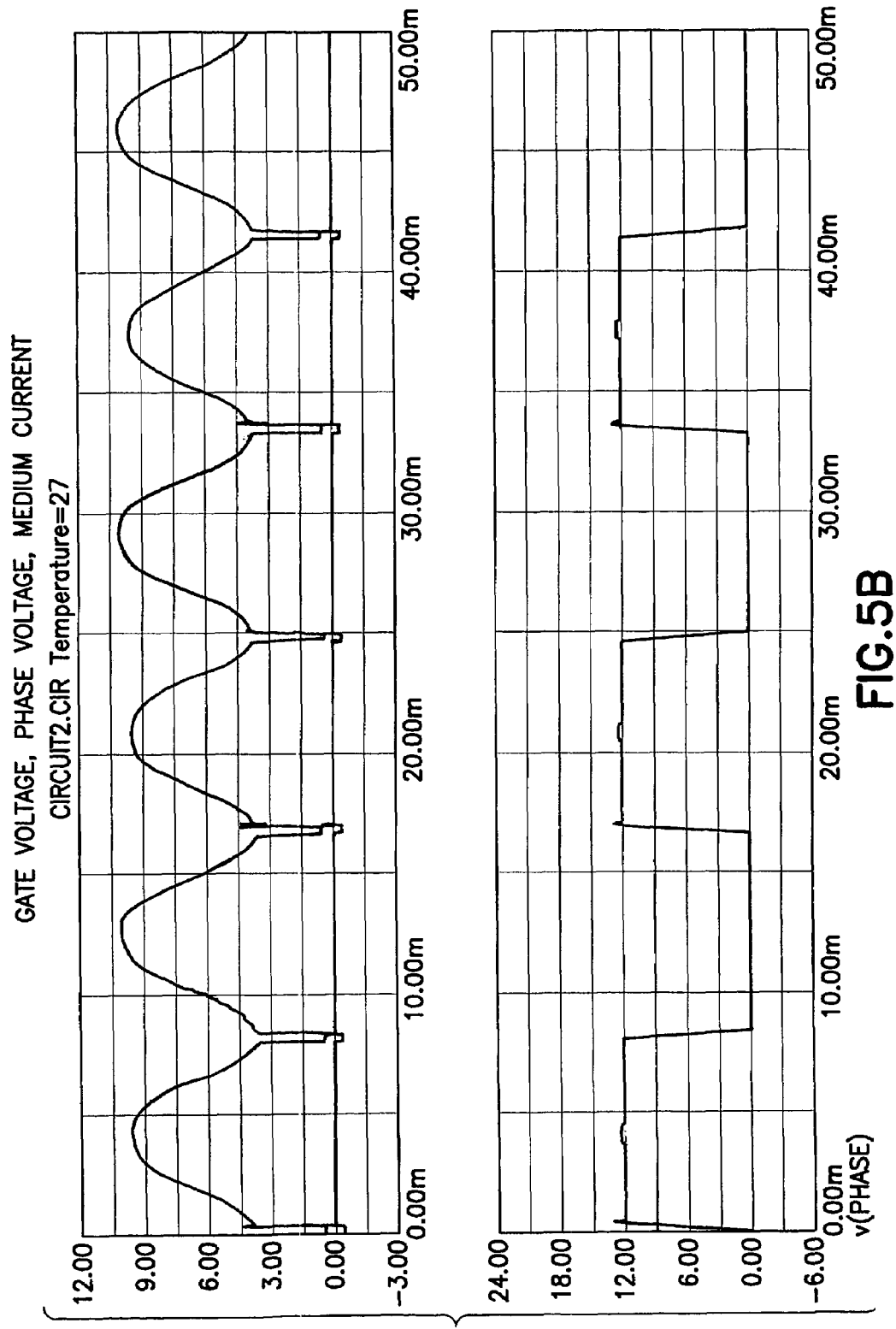
Figure 5C:
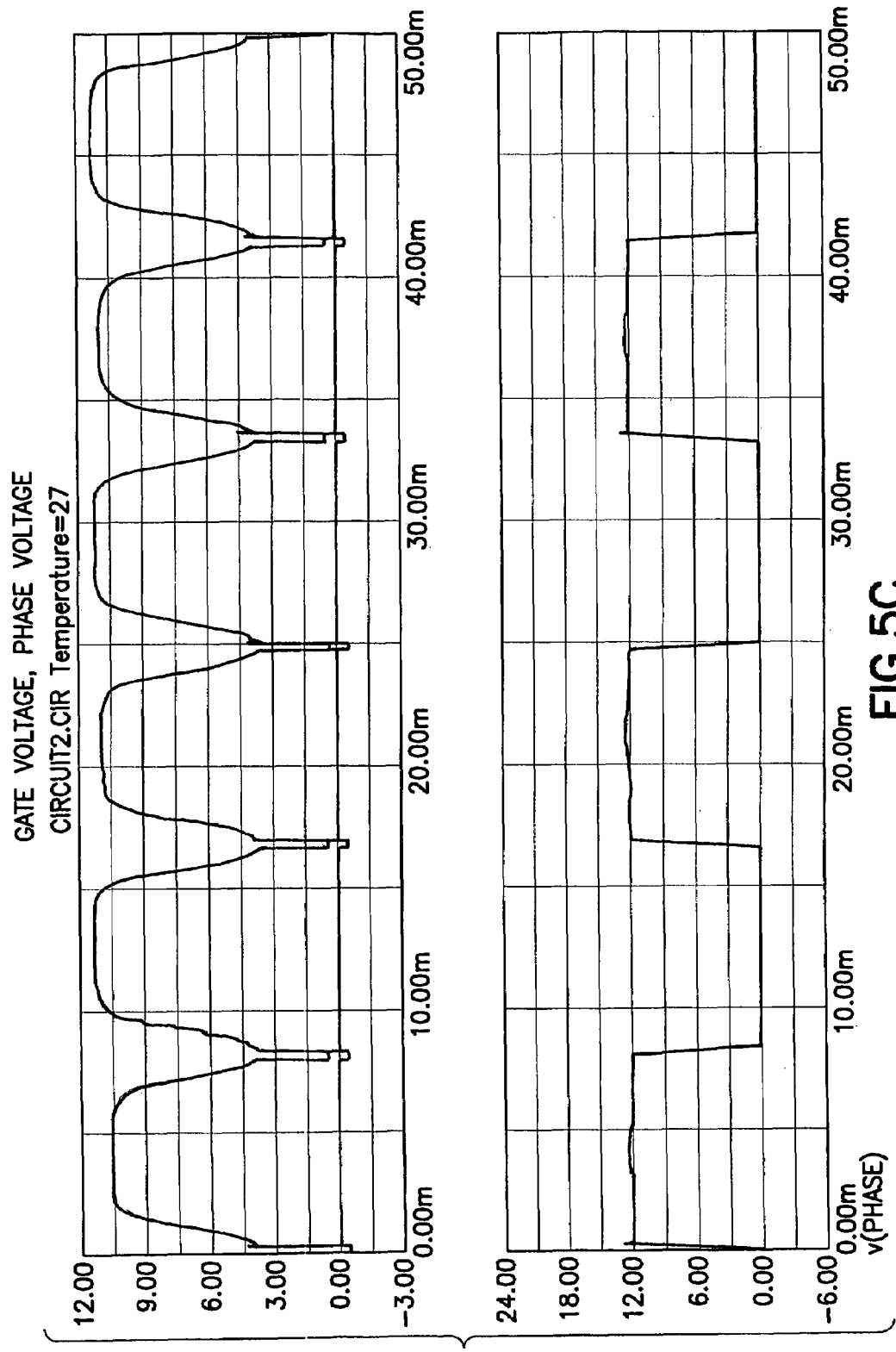

FIG. 5A shows the gate voltage signals generated by active rectification in the embodiment shown by FIG. 4 for a low current condition. FIGS. 5B and 5C illustrate the same for a medium current condition and a high current condition respectively.

Figure 6:
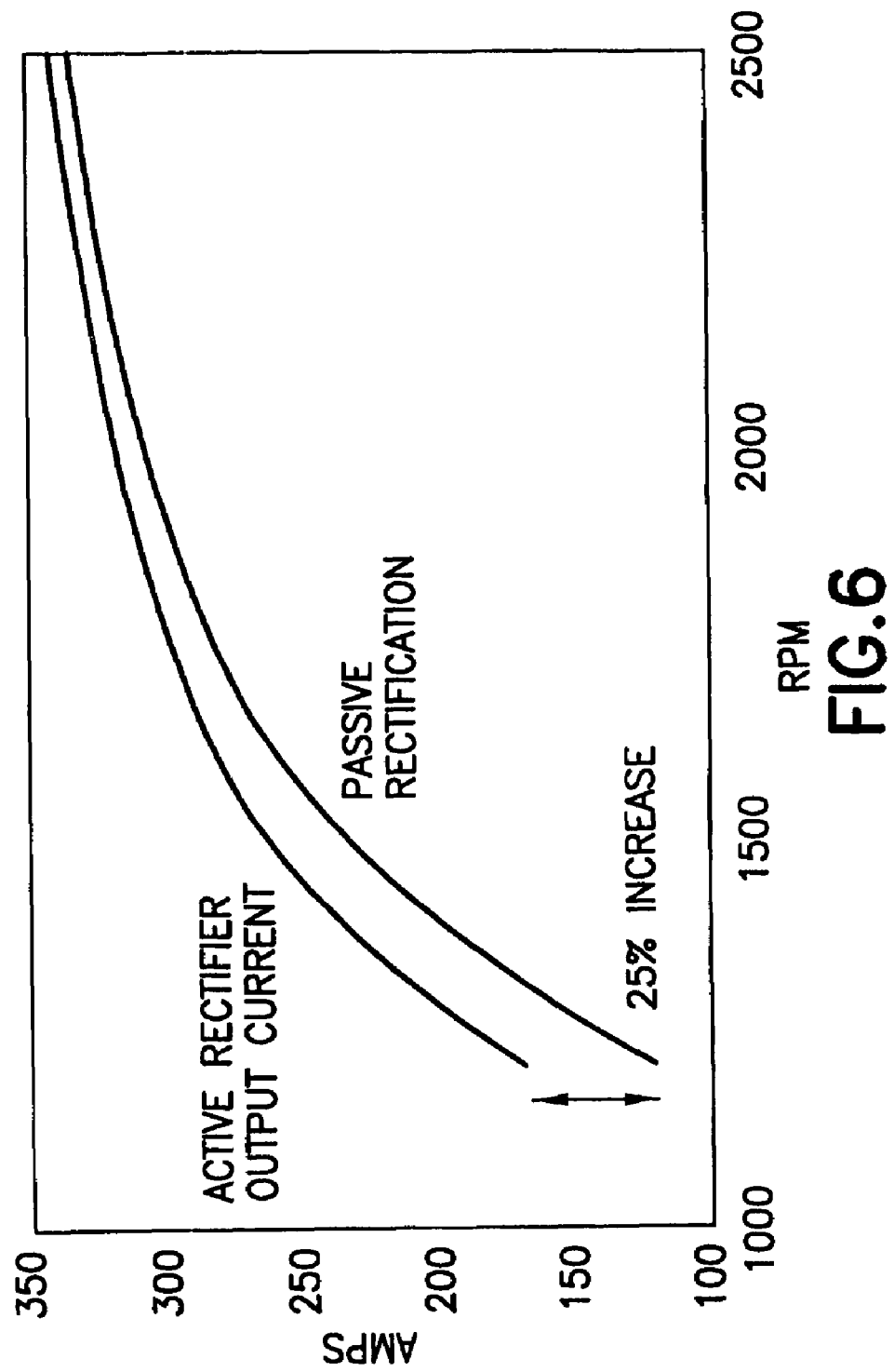
FIG. 6 graphically illustrates the improvement in power generation and efficiency over the prior art when active rectification is employed in an automotive application.

Referring to FIG. 6, an AIRR according to the present invention is capable of producing up to 25% more current compared to the prior art rectification scheme that uses passive elements. The power efficiency of an AIRR according to the present invention is particularly more pronounced at low RPMs. Thus, an AIRR according to the present invention is capable of providing power efficiently to the battery at idle speed. As a result, an AIRR according to the present invention can advantageously bring the battery into positive charging when the engine is idling.

Figure 7:
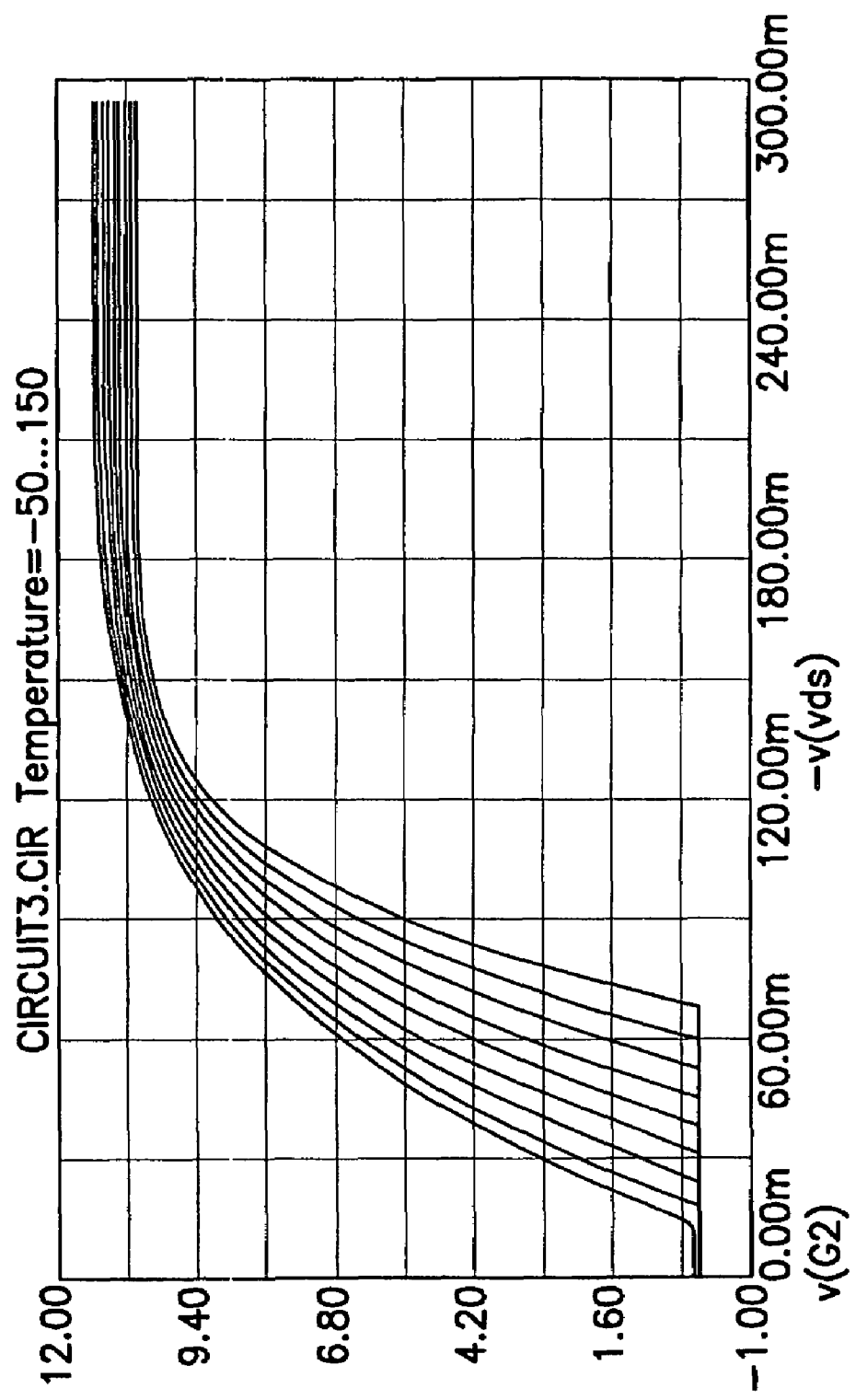
FIG. 7 graphically illustrates the behavior of driver and detection circuitry in response to changes in phase voltage for a plurality of temperatures.

In the example, shown by FIG. 4, a totem pole configuration is used for drivers 42, 43. FIG. 7 graphically illustrates the behavior of detector 40 and driver 42 in the embodiment shown by FIG. 4. One skilled in the art would recognize that other configurations may be employed to effect active rectification without deviating from the present invention.

Figure 8:
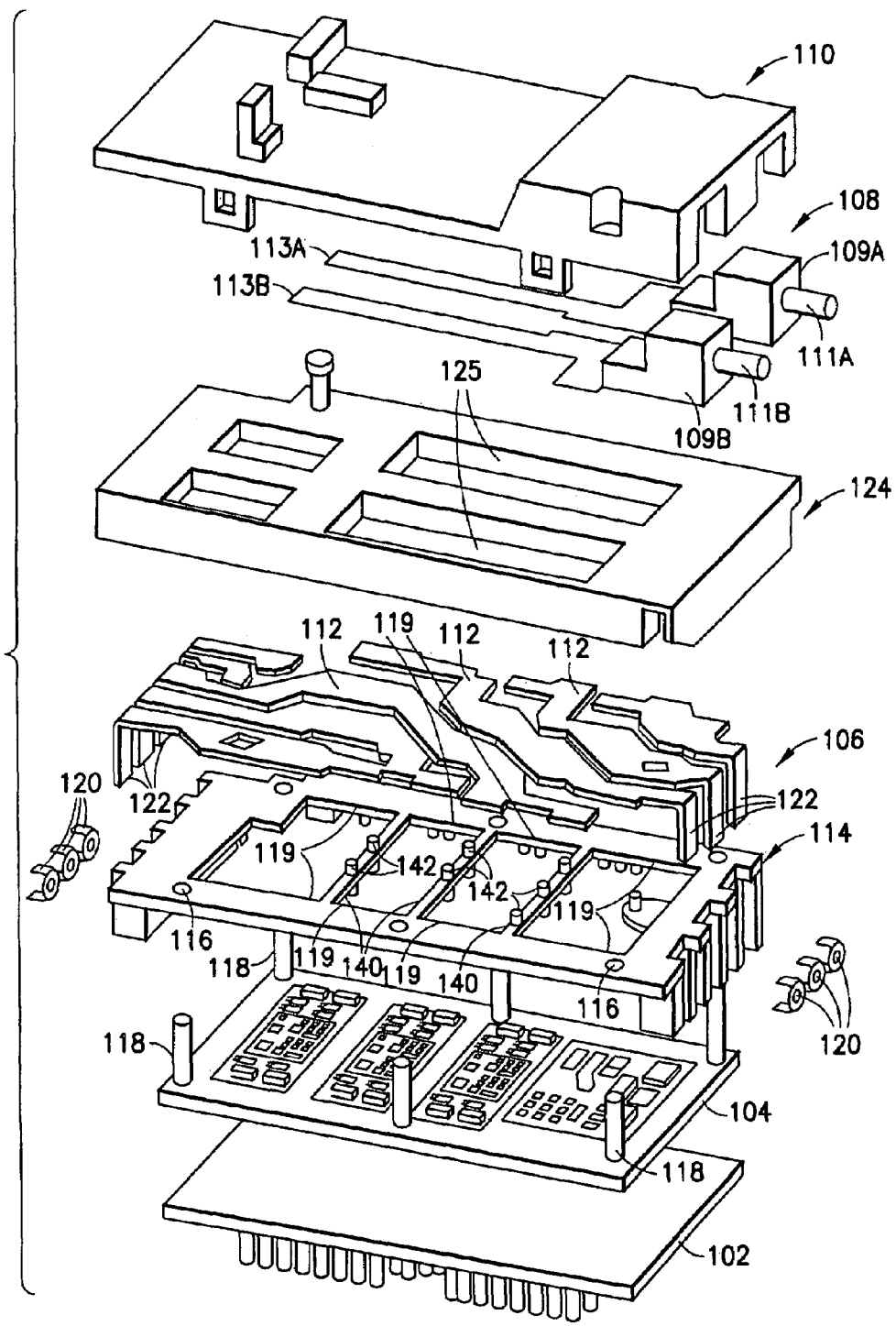
FIG. 8 shows an exploded view of an AIRR module according to the present invention.

According to the present invention, an AIRR is integrated within a single module. Referring to FIG. 8, an AIRR module 100 according to the present invention includes heatsink 102, base plate 104, phase lead frame 106, output lead frame 108, and housing cover 110.

Phase lead frame 106 includes a plurality of spaced conductive elements 112. Conductive elements 112 are supported above base plate 104 by phase lead frame support 114. Phase lead frame support 114 is preferably comprised of an engineering plastic and includes receiving apertures 116 which are adapted to receive posts 118 on base plate 104 so that phase lead frame support 114 can be supported on base plate 104, whereby phase lead frame 106 can be accessible from below through openings 119.

Phase lead support 114 includes cross bars 140. Each cross bar 140 includes a plurality of support pins 142 which extend above and below the same. Cross bars 140 contribute to the physical integrity of phase lead frame support 114, while support pins 142 provide support to conductive elements 112 from below.

Phase lead frame support 114 is also adapted to hold signal connector for the voltage regulator inputs from each phase of a stator. The signal connector is located on the rear side of phase lead frame support 114 and connects the rotor coil to the regulator. In the preferred embodiment of the present invention, an AIRR module includes signal connectors for six phases, three for each stator in a two stator alternator.

According to the preferred embodiment of the present invention, the stator connectors are bolt-on connectors 120 which bolt onto flat portions 122 of respective conductive elements 112 of phase lead frame 106. Preferably, three bolt-on connectors 120 are disposed on one side of two opposing sides of phase lead frame support 114 in order to optimize the stator output design of the alternator and provide more space efficiency. To facilitate the coupling of bolt-on connectors 120, flat portions 122 are provided with apertures to receive a bolt therethrough.

Output lead frame 108 according to the present invention includes two lead pieces 109A, 109B. Each lead piece 109A, 109B is intended to provide output from a respective stator in a double-stator type alternator. Output lead frame 108 is supported above phase lead frame 106 on output lead support 124. Output lead support 124 is preferably made from a suitable engineering plastic and includes openings 125 to allow access for phase lead frame 106 below.

Housing cover 110 covers all except external portions 111A, 111B of lead pieces 109A, 109B, respectively. External portions 111A, 11B are preferably bolt-on elements and are intended for external electrical connection to a battery or possibly two batteries in an automobile. Housing cover 110 is also preferably made from a suitable engineering plastic.

Figure 9:
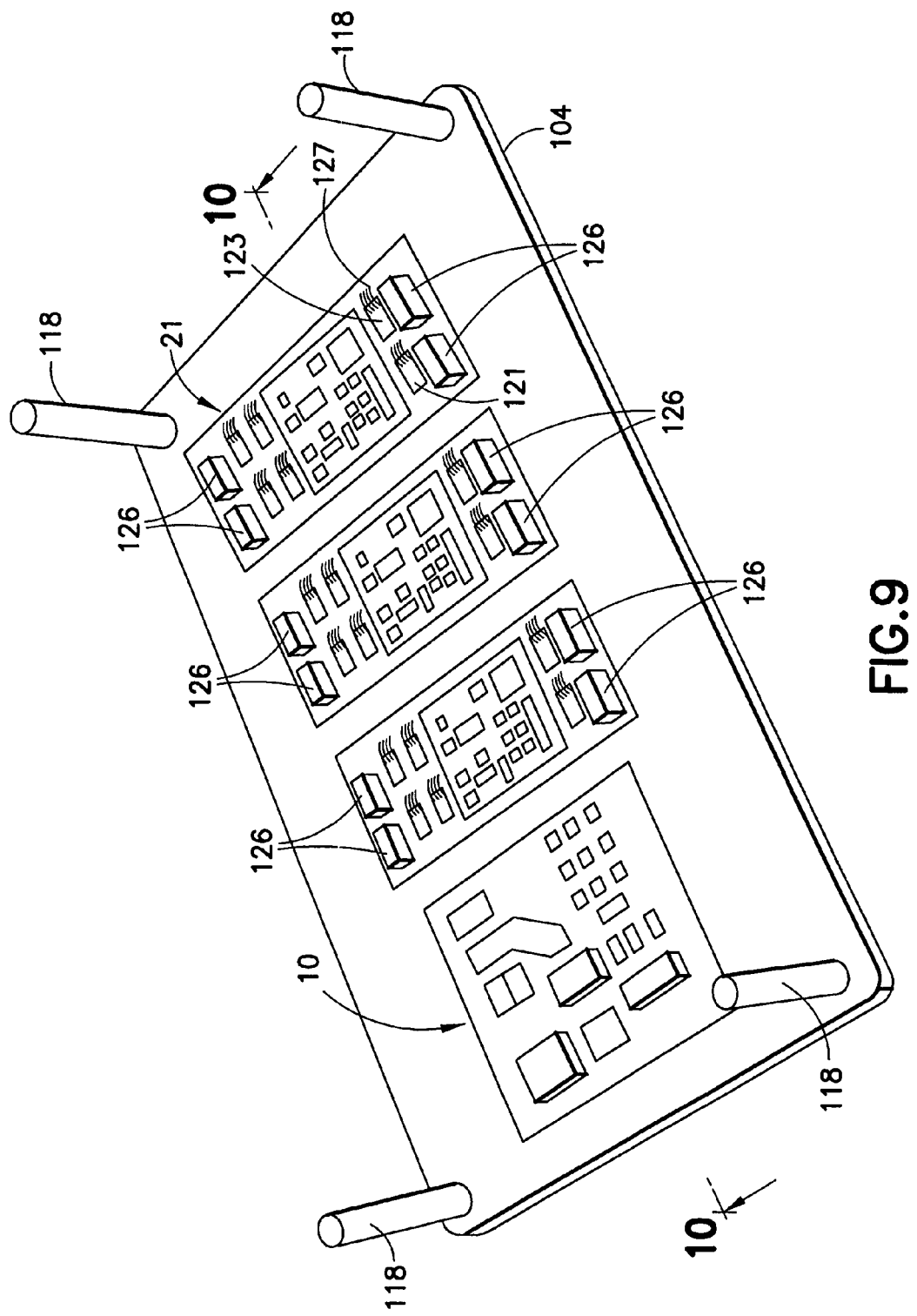
FIG. 9 shows a perspective view of the base plate of the AIRR module shown in FIG. 8.
Figure 13A:
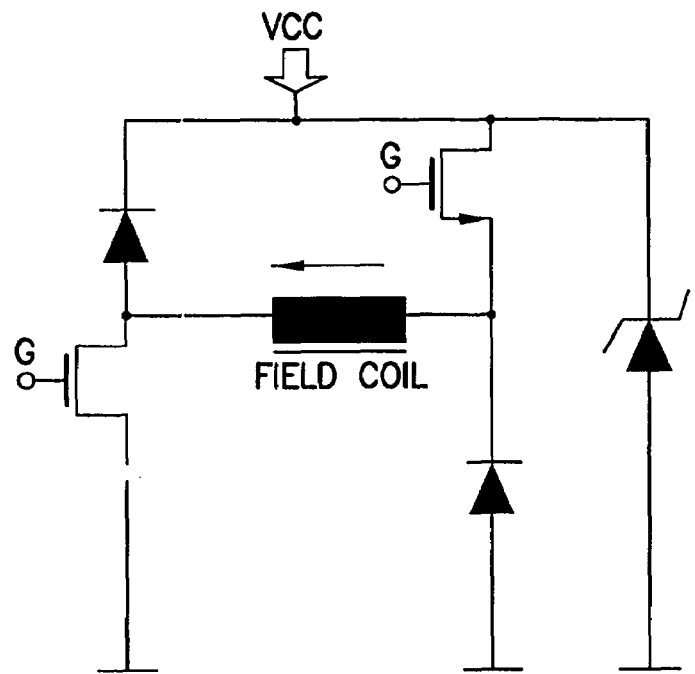
FIGS. 13A-13E illustrate a number of active load dump options which may be included with an AIRR module according to the present invention.
Figure 13B:
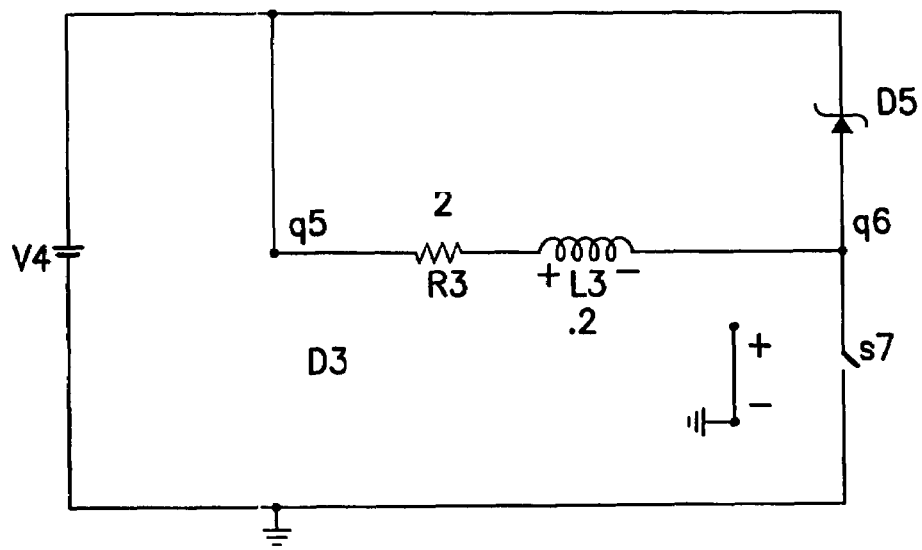
Figure 13C:
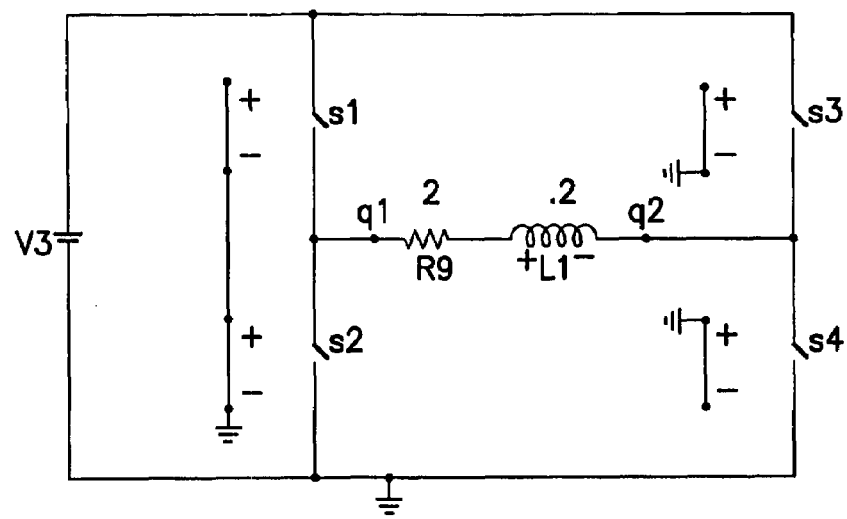
Figure 13D:
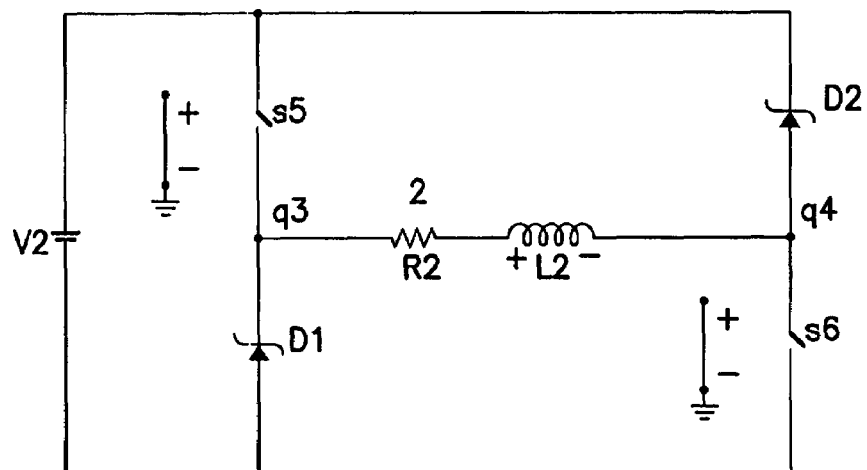
Figure 13E:
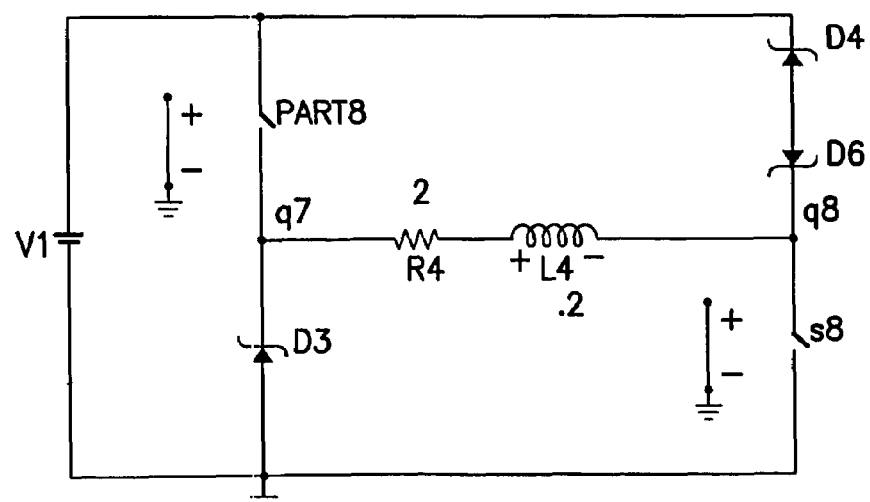

Referring now to FIG. 9, voltage regulator 10, rectifiers 21, and substrates supporting detectors (e.g. 40) and drivers (e.g. 42) (hereafter driver substrates 115) are supported on base plate 104.

Referring to FIG. 10, rectifiers 21 are preferably formed on direct bonded copper (DBC) substrates 117, which is suited for handling large currents. Preferably, to form each rectifier bare/unpackaged power MOSFETs (e.g. 121, 123) are soldered drain-side-down to the copper tracks of a DBC 117. The source and gate contacts are then wire bonded to appropriate conductive pads on DBC 117. Preferably, four bond wires 127 are used for connecting a source contact to a respective conductive pad, while the gate contact of each power MOSFET is connected to its corresponding gate pad on DBC 117 using a single wire bond. The gauge of the wire bond used for connecting the source of each power MOSFET is preferably higher than that of the wire bond used for gate connection.

According to an aspect of the present invention each DBC 117 supporting a rectifier circuit 21 is provided with solder blocks 126, which are preferably comprised of copper or a copper alloy. Each solder block serves as a raised bond pad for interconnection to a connection portion 113A, 113B of a respective output lead 109A, 109B.

In the preferred embodiment of the present invention, driver substrates 115 are made by hybrid thick-film technology on ceramic (e.g. alumina). Preferably, driver substrates are populated with standard SMD components 132.

Similarly, voltage regulator 10 is formed over substrate 130 similar to the one used for driver substrates. The various components for forming voltage regulator 10 include standard SMD components 132.

According to an aspect of the present invention, substrates 115, 130 are attached to base plate 104 using a suitable flexible adhesive 134 to prevent damage due to the differences in thermal expansion/contraction. A suitable adhesive may be Dow Corning Q1-9226 or 1-4173 silicone based thermally conductive adhesive. The in-plane interconnection between the substrates and to the ground are made by wire bonds which are coated to protect against moisture and vibration.

Referring to FIG. 11, phase lead frame support 114 is preferably attached to base plate 104 by, for example, a suitable adhesive such as Dow Corning Q1-9226 or 1-4173 silicone based thermally conductive adhesive. As a result, phase lead frame support 114 will surround the components disposed on base plate 104. Additional protection can then be provided by disposing soft silicone gel 140 within the openings 119 to cover the electronic components as illustrated schematically by FIG. 12.

According to an aspect of the present invention, conductive elements 112 are connected to conductive pads on rectifier substrates below through, for example, blocks 126, which are electrically connected to respective conductive pads on respective DBCs 117. Blocks 126, which serve as raised bond pads allow for easier processing and durability (reducing the height difference between the two bond feet).

Ground connection is preferably made through wire bonding. All the signal connections are accessed through a signal connector located directly above the substrates on lid 110. The connections are preferably made by flexible wires.

An AIRR according to the present invention may include a load dump feature in addition to other features described here. Examples of various embodiments for a load dump feature are shown by FIGS. 13A-13E.

Figure 14:
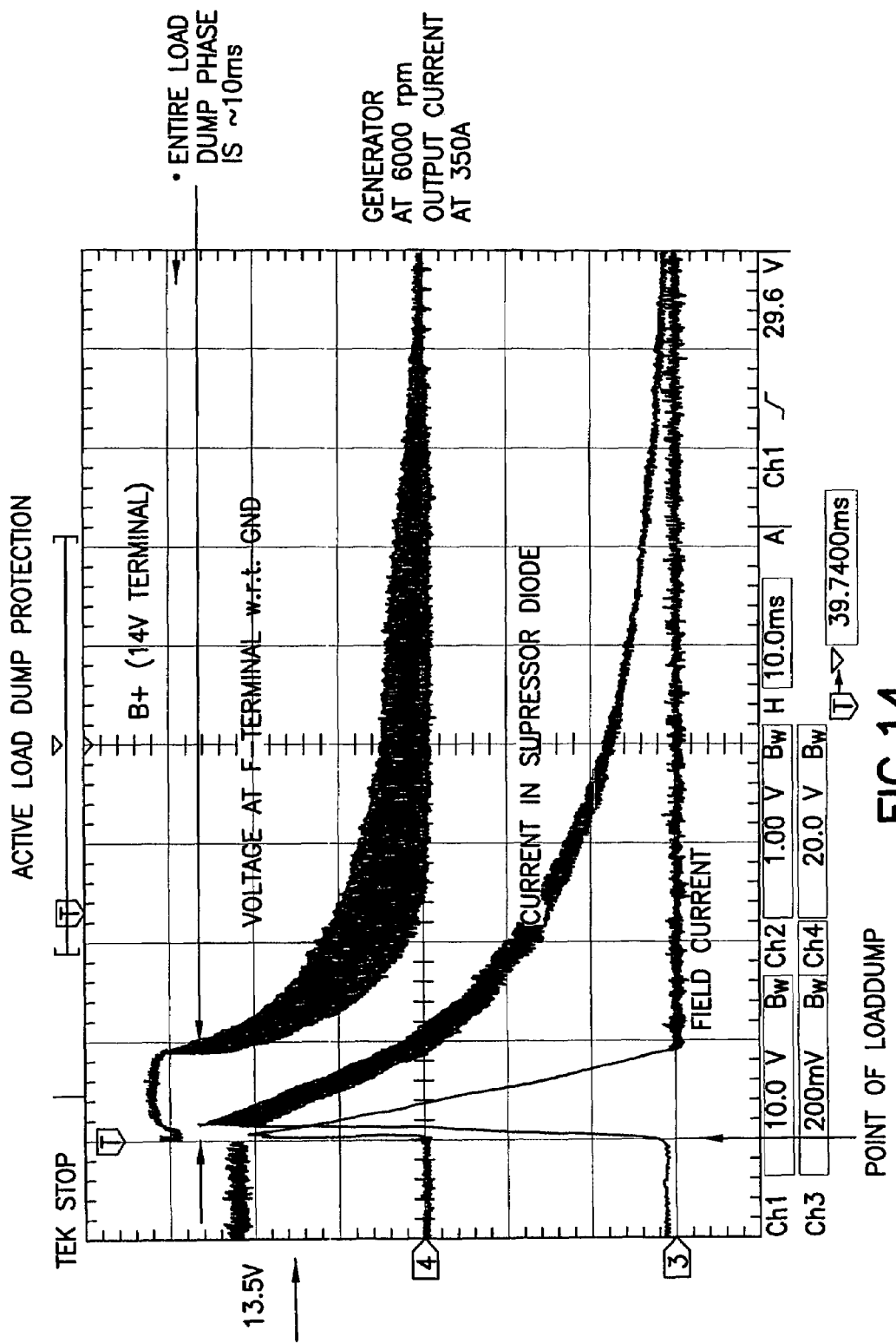
FIG. 14 graphically illustrates the behavior of a load dump feature in an AIRR according to the present invention.

FIG. 14 graphically illustrates the behavior of a load dump feature in an AIRR according to the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An integrated active rectifier module comprising;
   a base plate;
   a plurality of substrates attached to one surface of said base plate each with a respective flexible adhesive;
   a heatsink in thermal contact with said base plate and positioned opposite said substrates;
   power elements for an active rectifier for supplying recharging power to a battery of an automobile, said active rectifier being mounted on one substrate, and including a plurality of active rectification circuits each connectable to a respective phase of a stator to rectify the power output thereof;
   metallic conductive blocks on said one substrate to serve as raised pads, said conductive blocks being connected to corresponding leads disposed above said one substrate;
   elements for a voltage regulator to regulate the output voltage of said stator, said voltage regulator being mounted on another substrate; and
   elements for driving said power elements mounted on another substrate.

2. An integrated active rectifier module according to claim 1, further comprising a first lead frame, and a first lead frame support, said lead frame being supported on said first lead frame support over said plurality of substrates.

3. An integrated active rectifier module according to claim 2, wherein said lead frame support is attached to said base plate.

4. An integrated active rectifier module according to claim 2, wherein said lead frame support surrounds said plurality of substrate.

5. An integrated active rectifier module according to claim 2, further comprising a second lead frame, and a second lead frame support, said second lead frame being supported above said first lead frame by said second lead frame support.

6. An integrated active rectifier module according to claim 5, wherein said first lead frame is used to connect a phase of a stator to said active rectifier and said second lead frame serves as an output lead frame for said active rectifier.

* * * * *